United States Patent Office 3,485,571
Patented Dec. 23, 1969

3,485,571
ISOLATION OF METALLISABLE BLACK
MONOAZO DYESTUFFS
Kurt Breig, Cologne-Flittard, Walter Blum, Bensberg, Gerd Müller, Cologne-Flittard, and Hans Raab and Günther Steinmetz, Cologne-Stammheim, Germany, assignors to Farbenfabriken Bayer Aktiengesellschaft, Leverkusen, Germany, a corporation of Germany
No Drawing. Filed Mar. 9, 1966, Ser. No. 532,858
Claims priority, application Germany, Mar. 16, 1965, F 45,533
Int. Cl. C09b 29/00
U.S. Cl. 8—41   3 Claims

ABSTRACT OF THE DISCLOSURE

A process for isolating metallisable black monoazo dyestuffs which comprises spray-drying a solution consisting essentially of the dyestuff which solution results from the final coupling step in the production of the dyestuff. The process is particularly applicable to the production of the dyestuffs Diamantschwarz PV and/or P2B.

---

The rocessing of the metallisable black monoazo dyestuffs "Diamantschwarz" PV and P2B (Colour Index, second edition, Nos. 16,500 and 16,505) from the instant of their production to the marketable end product comprises several stages. The dyestuffs are first rendered acidic to Congo in an aqueous medium immediately after completion of the coupling, since they decompose in the alkaline coupling medium because of their sensitivity to air oxidation. The dyestuffs are then separated or precipitated by the addition of a definite amount of salt and subsequently isolated in a filter press. Dyestuff pastes with a varying degree of moisture are thus obtained. The mother liquors or waste liquors simultaneously obtained in this process frequently still contain substantial amounts of coloured organic by-products and inorganic salts. According to the new laws concerned with clean waste water, these waste liquors must not leave the dyestuff plant in the original state. In many cases the purification or processing of the waste liquors is still an unsolved problem the mastering of which may be very expensive.

The dyestuffs resulting in the form of pastes are then subjected to drying: devices such as steam-heated rollers or vacuum cabinets may be used for this purpose. After drying, the dyestuffs must be subjected to a grinding and mixing process in order to obtain them in a finely powdered form suitable for packing and to enable a standardised type to be produced, i.e. a commercial product which is always obtained with the same colour strength and shade. For this purpose, standardising material, such as inorganic salts, like rock salt, sodium sulphate, sodium carbonate, dextrin, phosphates and the like, and small amounts of other dyestuffs (shading dyestuffs) must be added. These impart the desired shade and strength to the end product.

The dyestuffs "Diamantschwarz" PV and P2B are commercially available not only as individual products but also mixed with one another and with suitable standardising agents and shading dyestuffs. Since these mixtures are characterised by excellent fastness properties of the after-chromed dyeings on wool, such as fastness to light, potting and wet processing, they have been widely accepted in industry, as have the individual dyestuffs.

The processes of isolating the dyestuffs from their aqueous coupling solutions, drying, mixing and grinding are time-consuming and require a substantial expenditure of labour involving inconveniences (dirt and dust) which are highly undesirable for physiological reasons.

It has now been found that the processes of separating the dyestuffs from the solutions in which they are formed, drying on the labour-consuming devices described above and possibly also mixing and grinding can be eliminated with advantage, when the aqueous dyestuff solutions or suspensions obtained in the production of the dyestuffs are immediately subjected to spray-drying, without previous isolation of the dyestuffs. An end product ready for sale is thus immediately obtained, when the desired shade and colour strength are adjusted by means of suitable additives in a definite proportion already in the reaction vessel in which the dyestuff is formed. This applies, in particular, also to the above-mentioned mixtures of the two dyestuffs which may have been obtained by mixing two reaction solutions or suspensions of the individual dyestuffs or by mixed coupling in a single reaction vessel. After the optional addition of additives such as standardising material and shading dyestuffs, the dyestuff suspension or solution is adjusted to a pH between 4 and 6, in order to prevent corrosive effects on the drying apparatus, and then passed into the spray drier through a conduit. Spray-drying with pressure spraying yields the dry dyestuff in form of a granulate which is poor in dust and superior to the conventional powdered form with regard to the handling and frequently also in respect of the dyeing properties. An improved solubility of the dyestuffs generally is achieved.

Compared with the conventional processes for the isolation of dyestuffs, the process according to the invention moreover presents the advantage of being substantially less labour-consuming, due to extensive automation. It also offers an ideal solution of the increasingly urgent waste water problem, since it is no longer necessary to drain the waste liquors of the coupling reaction.

The discovery that such a process can be applied to the technical production of "Diamantschwarz" PV and P2B and their mixtures, is extremely surprising, since it was to be assumed and has, indeed, always been taken for granted that the by-products which are formed in the preparation of the dyestuffs and were separated according to the previous method of operation from the precipitated dyestuff in the filtrate (mother liquor or waste liquor), would affect the quality or dyeing properties of the final dyestuff in an undesirable manner. However, it has now been found that, contrary to expectation, this reduction in quality does not occur.

The following examples are given for the purpose of illustrating the invention.

Example 1

The dyestuff "Diamantschwarz" PV (Colour Index No. 16,500) is prepared in known manner for example, by coupling in alkaline medium diazotized 1-amino-2-hydroxybenzene-5-sulphonic acid with 1,5-dihydroxynaphthalene to form Diamantschwarz PV or by coupling in alkaline medium diazotized 1-amnio-2-hydroxy-5-chlorobenzene-3-sulphonic acid with 1,5-dihydroxynaphthalene to form Diamantschwarz P2B. The dyestuff suspension thus obtained, which is acidic to Congo, is buffered to pH 4–6 and then examined for its colour strength and shade by withdrawing a sample. In accordance with the result of this examination, the necessary amount of standardising material and shading dyestuff is added. The dyestuff suspension is stirred for about 1 hour and then passed into the spray-drier. Drying is carried out according to the instructions customary for these apparatus. A dyestuff powder is then obtained, which has a residual moisture content of 1–3% and is ready for sale. If the spray-drying is carried out under a pressure of 15–20 atmospheres, the dyestuff is obtained in the form of a granulate which is poor in dust and has a better solubility in water than the dyestuff isolated by conventional methods.

Example 2

The dyestuff suspension which is obtained after preparation of the dyestuff "Diamantschwarz" P2B (Colour Index No. 16,505) and is acidic to Congo, is treated as described in Example 1. In modification of these instructions, it is possible, however, to pass the dystuff suspension which has been buffered to pH 4-6 into the spray-drier and to carry out the adjustment to the standardized commercial type with standardising agents and shading dyestuffs in a mixing drum after drying.

Example 3

To obtain a mixture of the dyestuffs "Diamantschwarz" PV and P2B, in which the dyestuffs are contained in a ratio of about 32-47%:about 42%, calculated on the pure dyestuff, the diazo components of the two dyestuffs are mixed in the corresponding proportion and coupling is then carried out in analogy with the process for the production of the individual dyestuffs. The suspension of the dyestuff mixture thus obtained is subjected to spray-drying according to Example 1.

As standardising materials there may be used in Examples 1, 2 and 3, for instance, salt, like rock salt (NaCl), and sodium sulphate, dextrin, phosphates, like sodium hexameta-phosphate and trisodium phosphate, the sodium salt of benzene sulphonic acids and sodium carbonate; as shading dyestuffs can be used, for instance, the dyestuffs CI 14,870, CI 14,100, CI 14,860 and CI 14,110 (Colour Index second edition).

We claim:

1. In a process for preparing the metallisable black monoazo dyestuffs Diamantschwarz PV obtained by coupling in alkaline medium diazotized 1-amino-2-hydroxy-benzene-5-sulphonic acid with 1,5-dihydroxynaphthalene and/or Diamantschwarz P2B obtained by coupling in alkaline medium diazotized 1-amino-2-hydroxy-5-chloro-benzene-3-sulphonic acid with 1,5-dihydroxynaphthalene; the improvement which comprises directly spray drying the reaction mixture containing the unpurified dyestuffs resulting from the last coupling step.

2. The process according to claim 1 further comprising the step of adding minor proportions of standardising agents and/or shading dyestuffs to the unpurified dyestuff mixture prior to spray-drying said solution or suspension.

3. The process according to claim 1 wherein the reaction mixture contains both unpurified Diamantschwarz PV and P2B.

References Cited

UNITED STATES PATENTS

| | | | |
|---|---|---|---|
| 2,819,258 | 1/1958 | Schmid | 8—79 |
| 2,070,739 | 2/1937 | Krauss et al. | 8—79 |
| 2,574,597 | 11/1951 | Saluin et al. | 260—208 |

NORMAN G. TORCHIN, Primary Examiner

J. E. CALLAGHAN, Assistant Examiner

U.S. Cl. X.R.

8—79; 260—208